US007574936B2

(12) United States Patent
Takada

(10) Patent No.: US 7,574,936 B2
(45) Date of Patent: Aug. 18, 2009

(54) REVERSIBLE TRANSMISSION MECHANISM

(75) Inventor: Seiichi Takada, Kuwana (JP)

(73) Assignee: NTN Corporation, Osaka (JP)

( * ) Notice: Subject to any disclaimer, the term of this patent is extended or adjusted under 35 U.S.C. 154(b) by 274 days.

(21) Appl. No.: 11/651,050

(22) Filed: Jan. 9, 2007

(65) Prior Publication Data
US 2007/0173368 A1    Jul. 26, 2007

(30) Foreign Application Priority Data
Jan. 25, 2006    (JP)    ............... 2006-016566

(51) Int. Cl.
*F16H 3/02*    (2006.01)
(52) U.S. Cl. ............................... 74/355; 74/379
(58) Field of Classification Search .................. 74/355, 74/379
See application file for complete search history.

(56) References Cited
U.S. PATENT DOCUMENTS
2,161,702 A * 6/1939 Durig ........................ 74/379
2,561,104 A * 7/1951 Fawick ...................... 74/379
2,990,728 A * 7/1961 Grenier ..................... 475/131

FOREIGN PATENT DOCUMENTS
JP    4-039126    2/1992

* cited by examiner

*Primary Examiner*—Sherry L Estremsky
*Assistant Examiner*—Erin D Bishop
(74) *Attorney, Agent, or Firm*—Wenderoth, Lind & Ponack, L.L.P.

(57) ABSTRACT

A reversible transmission mechanism includes an input member rotatable about a fixed shaft and having a bevel gear, a first shaft member rotatable about the fixed shaft and having a shaft portion extending perpendicular to the fixed shaft, and a second shaft member rotatable about the fixed shaft and rotationally fixed to the first shaft member. An output member is rotatably mounted around the second shaft member and has a bevel gear at one end thereof axially facing the bevel gear of the input member. A planetary bevel gear is rotatably mounted around the shaft portion of the first shaft member so as to mesh with the bevel gears of the input and output members. The second shaft member is selectively coupled to and uncoupled from the output member by a clutch. When the second shaft member is uncoupled from the output member, the rotation of the second shaft member is stopped by a brake.

13 Claims, 6 Drawing Sheets

REVERSIBLE TRANSMISSION MECHANISM

BACKGROUND OF THE INVENTION

The present invention relates to a reversible transmission mechanism which is capable of converting the rotation of an input member to the rotation of an output member in either direction.

It is required that some of a large number of rollers used in copiers and printers be rotatable in either direction in order to e.g. print both sides of sheets. Rotation is transmitted to such rollers through reversible transmission mechanisms, which include two types, i.e. one including spur gears through which rotation is transmitted to the output shaft, and one including bevel gears through which rotation is transmitted to the output shaft. In the former type, because the input and output shafts have to be disposed parallel to each other while being sufficiently spaced from each other, this reversible transmission mechanism is not sufficiently compact. The latter type is not compact either, because the input and output shafts have to be arranged to extend perpendicular to each other.

There are also known reversible transmission mechanisms which can convert the rotation of the input member to the rotation of output member in either direction through bevel gears, with their input and output members mounted on a single common shaft. One such reversible transmission mechanism is disclosed in JP patent publication 4-39126A, which is a steering gear box comprising an input shaft (input member), an output shaft (output member), a first boss (intermediate member) rotatably disposed around the input shaft, bevel gears rotatably mounted on fixed shafts and meshing with the input shaft and the first boss to rotate the first boss in a direction opposite to the direction in which the input shaft is rotated, a second boss fixed to the input shaft and rotated in the same direction as the input shaft, and a sleeve which is axially movable to selectively couple one of the first and second bosses to the output shaft, thereby selectively rotating the output shaft in one of the opposite directions. The sleeve is also movable to a neutral position where the output shaft is coupled to neither of the first and second bosses and thus freely rotatable.

Although the reversible transmission mechanism disclosed in this publication has its input and output members disposed coaxially with each other, since it is necessary to provide the intermediate member around the input member between the input and output members in order to rotate the output member in the reverse direction, extra parts are required to support the intermediate member, in addition to the intermediate member itself. This reversible transmission mechanism is naturally complicated in structure.

SUMMARY OF THE INVENTION

An object of the present invention is to provide a reversible transmission mechanism of the above-described type which is made up of fewer parts, and simple in structure.

According to the present invention, there is provided a reversible transmission mechanism comprising an input member rotatable about a central axis and having a bevel gear, a first shaft member rotatable about the central axis and having a shaft portion extending perpendicular to the central axis, a second shaft member rotatable about the central axis and rotationally fixed to the first shaft member, an output member rotatably mounted around the second shaft member and having a bevel gear at a first end thereof axially facing the bevel gear of the input member, a planetary bevel gear rotatably mounted around the shaft portion of the first shaft member so as to mesh with the bevel gears of the input and output members, a clutch for selectively coupling and uncoupling the second shaft member to and from the output member, and a brake for stopping rotation of the second shaft member while the second shaft member is uncoupled from the output member, whereby the output member is rotated in the same direction as the input member while the output member is coupled to the second shaft member through the clutch, and is rotated in a direction opposite to the direction in which the input member is rotated while the output member is uncoupled from the second shaft member.

With this arrangement, when the output member is rotationally fixed to the second shaft member through the clutch, the planetary bevel gear is rotated about the central axis together with the input and output members. Thus, the output member is rotated in the same direction as the input member. When the output member is uncoupled from the second shaft member, the second shaft member is prevented from rotating by the brake, so that the planetary bevel gear rotates about the shaft portion of the first shaft member without rotating about the central axis. The output member is thus rotated in the reverse direction. The output member can therefore be rotated in either direction with a simpler structure and fewer parts.

Preferably, the clutch comprises a tubular portion formed on a second end of the output member opposite to the first end and having first serrations on a radially outer surface thereof, second serrations formed on a radially outer surface of an end portion of the second shaft member protruding from the tubular portion, the first and second serrations defining circles having equal diameters to each other and axially aligned with each other, and a coupling ring having third serrations formed on a radially inner surface thereof and fitted around the tubular portion with the third serrations meshing with the first serrations, the coupling member being axially slidable between a first position where the third serrations are in engagement with the first serrations and not with the second serrations, thereby uncoupling the output member from the second shaft member, and a second position where the third serrations are in engagement with both the first and second serrations, thereby coupling the output member to the second shaft member. Such a clutch is simple in structure.

Preferably, the second and third serrations have their side walls tapered at their opposed ends into pointed tips to define teeth such that the third serrations can be smoothly guided axially into between the adjacent second serrations. With this arrangement, the clutch can be smoothly engaged.

Further preferably, the teeth of the second and third serrations have a relief angle toward the apexes of the respective serrations. With this arrangement, the clutch is more smoothly engageable.

The brake may comprise axial grooves formed in the radially outer surface of the end portion of the second shaft member axially outwardly of the second serrations, and a claw configured to be inserted into one of the grooves, thereby stopping rotation of the second shaft member. Such a brake is simple in structure.

Preferably, the axial grooves are arranged over the entire circumference of the radially outer surface of the end portion of the second shaft member so that the rotation of the second shaft member can be stopped instantly at any desired circumferential position.

Preferably, the clutch further comprises an elastic member which biases the coupling ring toward the second serrations until the third serrations engage the second serrations, and a push-back member for pushing the coupling ring toward the first end of the output member, thereby disengaging the third serrations from the second serrations, and the claw of the brake is a portion of the push-back member. With this arrangement, simply by moving the push-back member, the output member can be easily coupled to or uncoupled from the second shaft member. When the output member is uncoupled from the second shaft member, the brake can stop the rotation of the second shaft member.

In one arrangement, the push-back member is configured to be radially movable toward and away from an axially outer end of the coupling ring, and has a tapered surface configured to abut the axially outer end of the coupling ring, thereby pushing the coupling ring toward the first end of the output member when the push-back member is moved in a radial direction, and the brake is configured to be radially inserted into one of the axial grooves.

In another arrangement, the push-back member is configured to be axially movable toward and away from an axially outer end of the coupling ring, and is configured to push the coupling ring toward the first end of the output member by moving axially toward the first end of the output member, and the claw of the brake is configured to be axially inserted into one of the axial grooves.

In a preferred embodiment, the axial grooves are serration-shaped grooves arranged circumferentially spaced apart from each other over the entire circumference, the push-back member is a tubular member having a radially inner surface, there are a plurality of the claws formed on the radially inner surface of the push-back member, the plurality of claws are serration-shaped members arranged circumferentially spaced from each other over the entire circumference, and at axially opposed ends, ribs defining the axial grooves and the claws have their side walls tapered into pointed tips to define teeth such that the claws can be smoothly guided into the respective axial grooves.

The output member preferably carries on a radially outer surface thereof a spur gear as a rotation output member because such a spur gear is compact in size.

Similarly, the input member also preferably carries on a radially outer surface thereof a spur gear as a rotation input member.

Also preferably, the spur gear of the input member is used as a rotation output member. With this arrangement, it is possible to rotate a plurality of members in the same direction all at once through this spur gear.

BRIEF DESCRIPTION OF THE DRAWINGS

Other features and advantages of the present invention will become apparent from the following description made with reference to the accompanying drawings, in which.

DETAILED DESCRIPTION OF THE PREFERRED EMBODIMENTS

Figure 1:
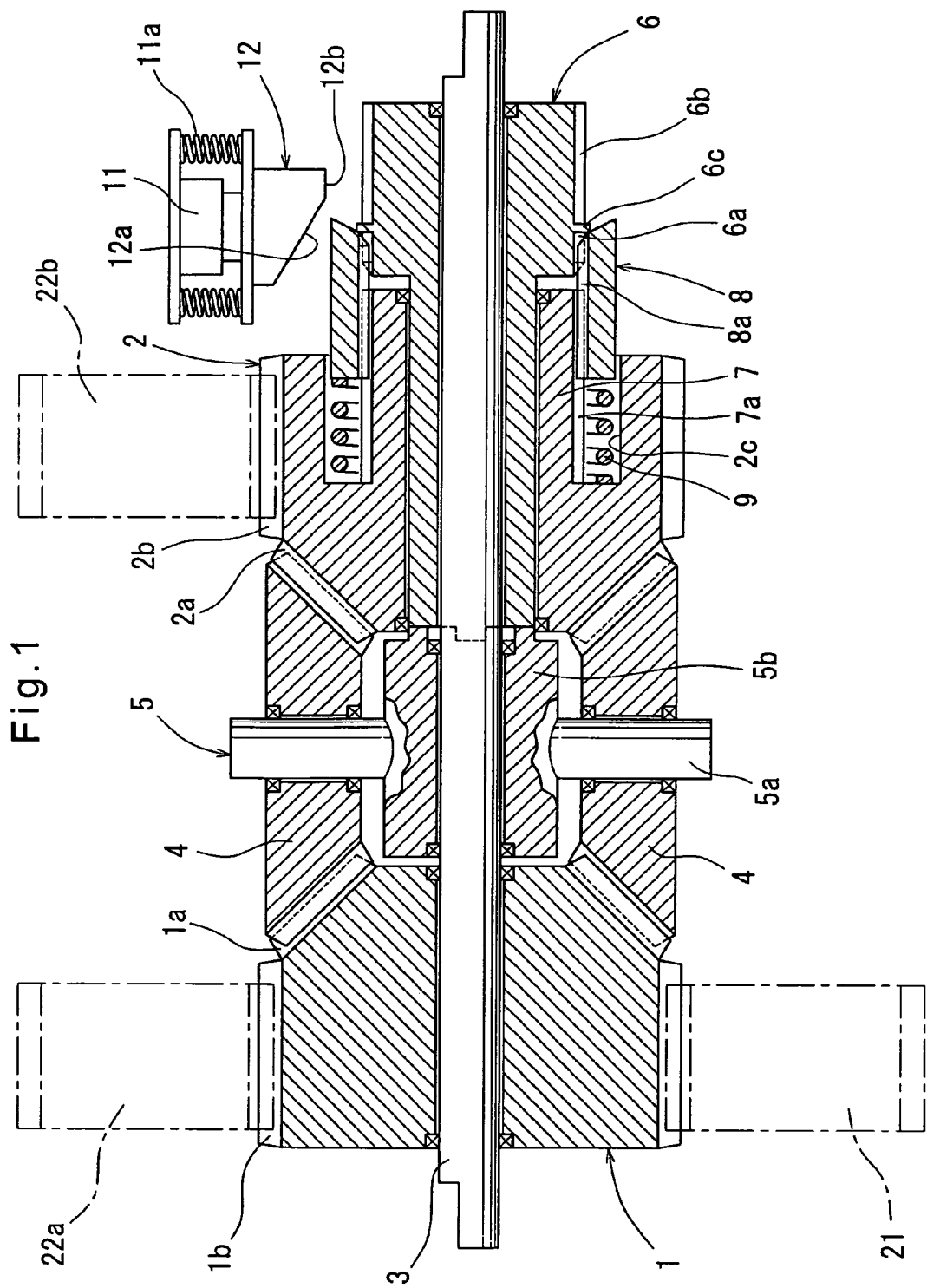
FIG. 1 is a vertical sectional view of a reversible transmission mechanism according to a first embodiment of the present invention.
Figure 2:
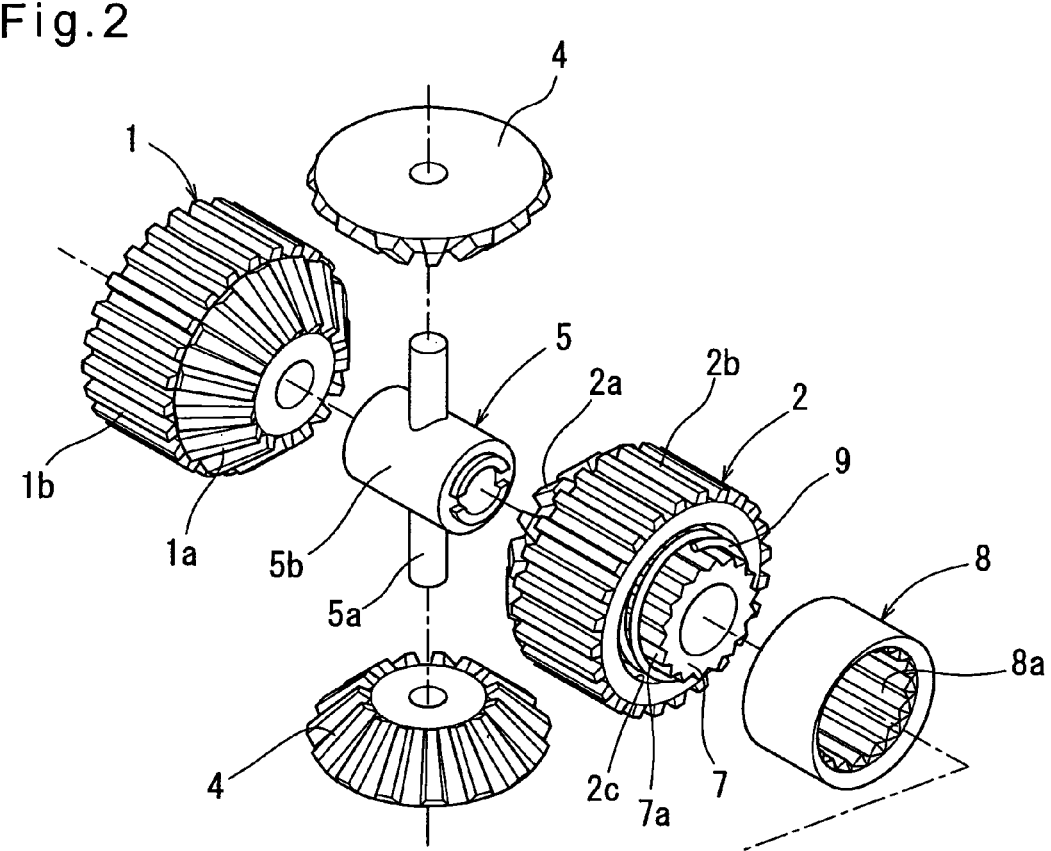
FIG. 2 is an exploded perspective view of a portion of the reversible transmission mechanism of FIG. 1.
Figure 2:
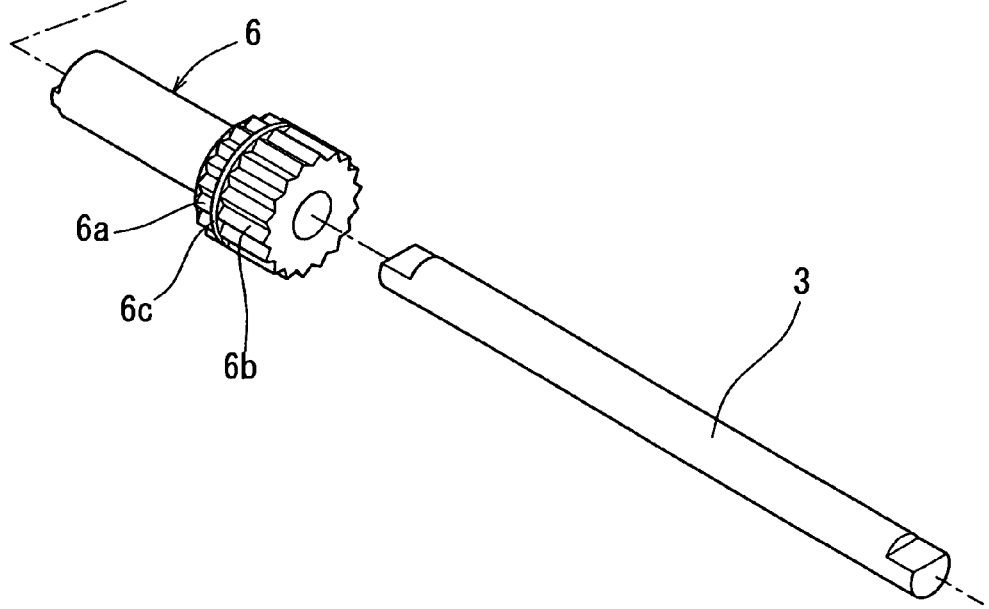

Now referring to the drawings, the embodiments of the present invention are described. FIGS. 1 to 4 show the reversible transmission mechanism according to the first embodiment, which includes, as shown in FIGS. 1 and 2, an input member 1 and an output member 2 that are rotatably mounted on a common fixed shaft 3 and carry bevel gears 1a and 2a, respectively, that axially face each other. A first shaft member 5 is disposed between the input and output members 1 and 2. The first shaft member 5 comprises a tubular portion 5b rotatably fitted around the fixed shaft 3, and two shafts 5a fixed to and extending from the tubular portion 5b in directions opposite to each other and perpendicular to the fixed shaft 3. A planetary bevel gear 4 is rotatably mounted on each shaft 5a so as to mesh with the bevel gears 1a and 2a. The input member 1 and the output member 2 carry an input spur gear 1b and an output spur gear 2b on their outer surfaces, respectively. Idler gears 22a and 22b mesh with the spur gears 1b and 2b, respectively. A driving gear 21 meshes with the spur gear 1b. The driving gear 21 is rotated in a first direction. Thus, the input member 1 is rotated in a second direction opposite to the first direction by the driving gear 21, and the idler gear 22a is rotated in the first direction by the input member 1. As will be described in detail later, the idler gear 22b can be rotated in either of the first and second directions.

A second shaft member 6 is rotatably mounted around the fixed shaft 3 and rotatably inserted in the output member 2. The first and second shaft members 5 and 6 are rotationally fixed relative to each other by engaging protrusions formed on each of the opposed end surfaces of the shaft members 5 and 6 in recesses formed in the other of the opposed end surfaces. At its end remote from the first shaft member 5, the second shaft member 6 has a large-diameter portion axially protruding from the output member 2. On the outer surface of the large-diameter portion of the second shaft member 5, serrations 6a and axial grooves 6b are formed with the latter disposed rightwardly (in FIG. 1) of the former. Further, an annular rib 6c is formed between the serrations 6a and axial grooves 6b.

The output member 2 has a radially inner tubular portion 7 extending toward the large-diameter portion of the second shaft member 6. Around the tubular portion 7, an annular recess 2c is defined. The tubular portion 7 has a radially outer surface that is equal in diameter to the outer surface of the large-diameter portion of the second shaft member 6 where the serrations 6a are formed. On the radially outer surface of the tubular portion 7, serrations 7a are formed. A coupling ring 8 is fitted around the tubular portion 7. The coupling ring 8 has serrations 8a on its radially inner surface which engage the serrations 7a of the tubular portion 7 so that the coupling ring 8 is axially slidable but not rotatable relative to the tubular portion 7. The coupling ring 8 is biased by a coil spring 9 mounted around the tubular portion 7 toward the large-diameter portion of the second shaft member 6 until its serrations 7a engage the serrations 6a of the second shaft member 6 too. The annular rib 6c of the second shaft member 6 prevents separation of the coupling ring 8.

Figure 3A:
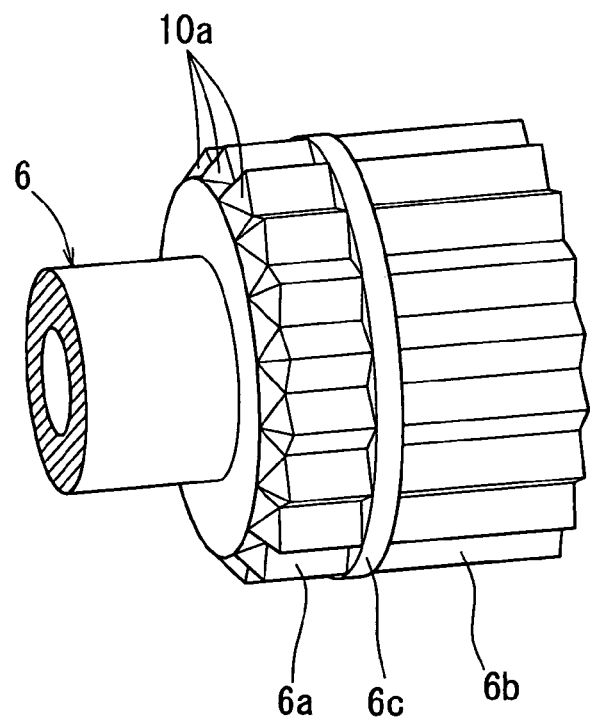
FIGS. 3A and 3B are perspective views of the second shaft member and the coupling ring, showing teeth of the respective serrations of the second shaft member and the coupling ring formed at the opposed ends thereof.
Figure 3B:
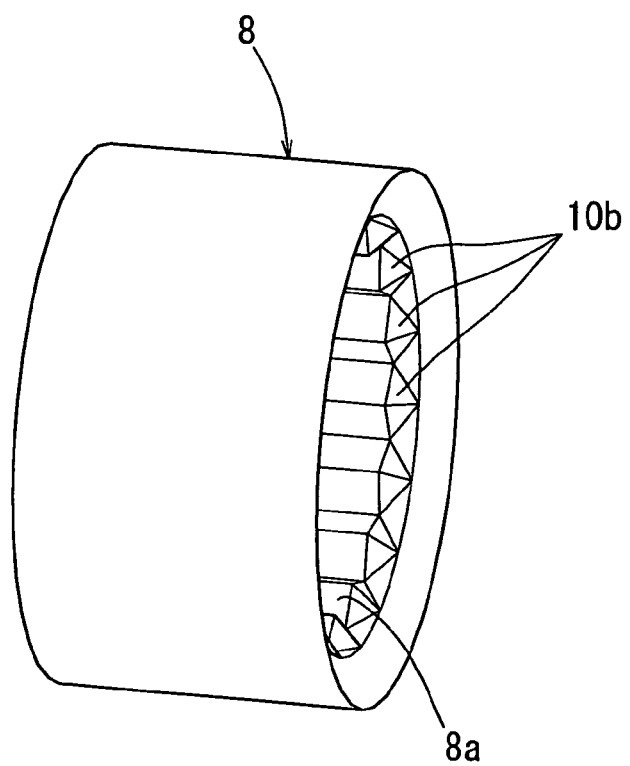

As shown in FIGS. 3A and 3B, at their opposed ends, the serrations 6a of the second shaft member 6 and the serrations 8a of the coupling ring 8 have their side walls tapered into pointed tips to define teeth 10a and 10b having a relief angle toward the apexes of the respective serrations. The teeth 10a and 10b axially engage each other, thereby smoothly guiding the serrations 8a of the coupling ring 8, which is biased by the coil spring 9, into engagement with the serrations 6a of the second shaft member 6.

As shown in FIG. 1, radially outwardly of the right-hand end of the coupling ring 8, a push-back member 12 is provided which is radially inwardly biased by compression coil springs 11a so as to be radially movable by selectively activating and deactivating a solenoid 11.

When the solenoid 11 is activated, as shown in FIG. 1, the push-back member 12 is magnetically pulled toward the solenoid 11, i.e. moved radially outwardly against the force of the springs 11a, so that the coil spring 9 pushes the coupling ring 8 rightwardly until the serrations 8a of the coupling ring 8 engage both the serrations 7a of the tubular portion 7 and the serrations 6a of the second shaft member 6. Now the output member 2 is rotationally fixed to the second shaft member 6 and thus rotationally fixed to the first shaft member 5. Thus, when the input shaft 1 is rotated in the second direction in this state, the planetary bevel gears 4 rotate about the axis of the fixed shaft 3 without rotating about the axes of the shafts 5a of the first shaft member 5. The output member 2 is therefore rotated in the same direction as the input member 1, i.e. in the second direction, so that the idler gear 22b is rotated in the first direction, i.e. in the same direction as the driving gear 21.

Figure 4:
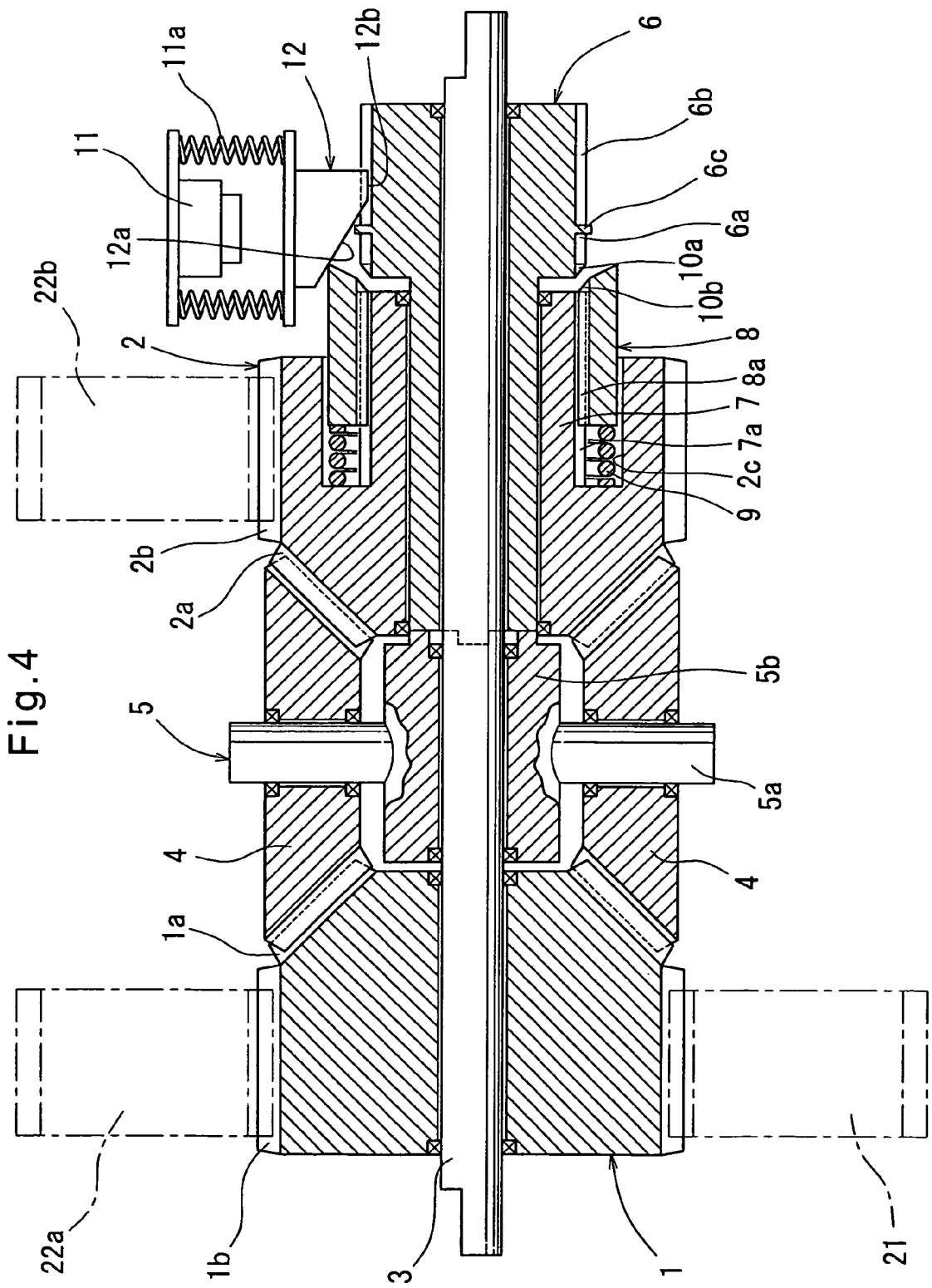
FIG. 4 is a vertical sectional view of the reversible transmission mechanism of FIG. 1, showing the state where the output member is rotated in a direction opposite to the direction in which the input member is rotated.

When the solenoid 11 is deactivated, as shown in FIG. 4, the push-back member 12 is moved radially inwardly to push back the coupling ring 8 with its tapered surface 12a against the force of the coil spring 9 until the serrations 8a of the coupling ring 8 disengage from the serrations 6a of the second shaft member 6. Simultaneously, a claw 12b of the push-back member 12 is inserted radially inwardly into one of the axial grooves 6b of the second shaft member 6, thereby preventing rotation of the second shaft member 6 and thus the first shaft member 5. In this state, since the first shaft member 5 is not rotatable, when the input member 1 is rotated in the second direction, the planetary bevel gears 4 are rotated about the axes of the shafts 5a of the first shaft member 5 but not about the axis of the fixed shaft 3, so that the output member 2 is rotated in the first direction, i.e. the direction opposite to the direction in which the input shaft is rotated. The idler gear 22b is therefore rotated in the second direction, i.e. the direction opposite to the direction in which the driving gear 21 is rotated.

Figure 5:
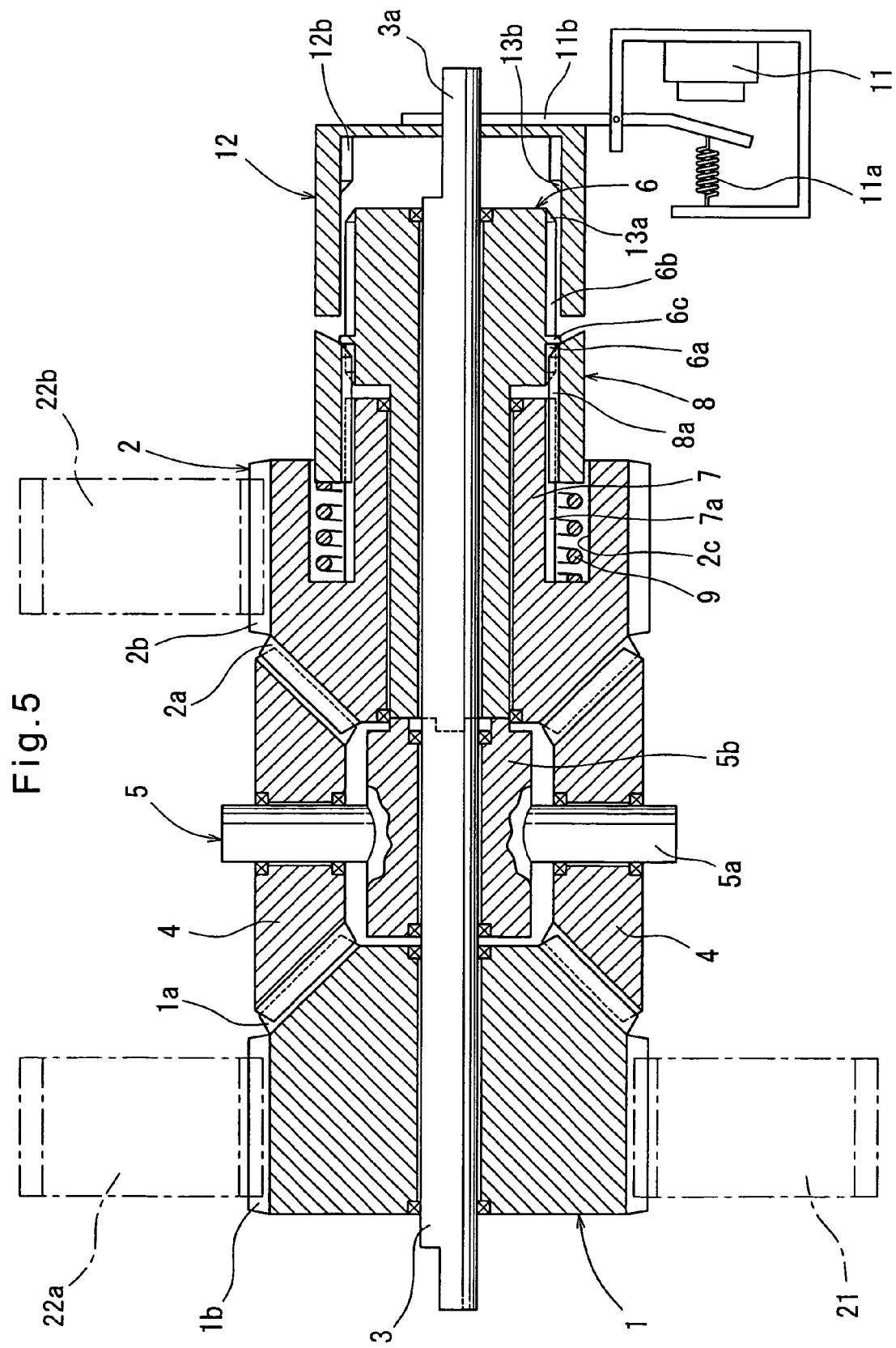
FIG. 5 is a vertical sectional view of a reversible transmission mechanism according to a second embodiment of the present invention.
Figure 6:
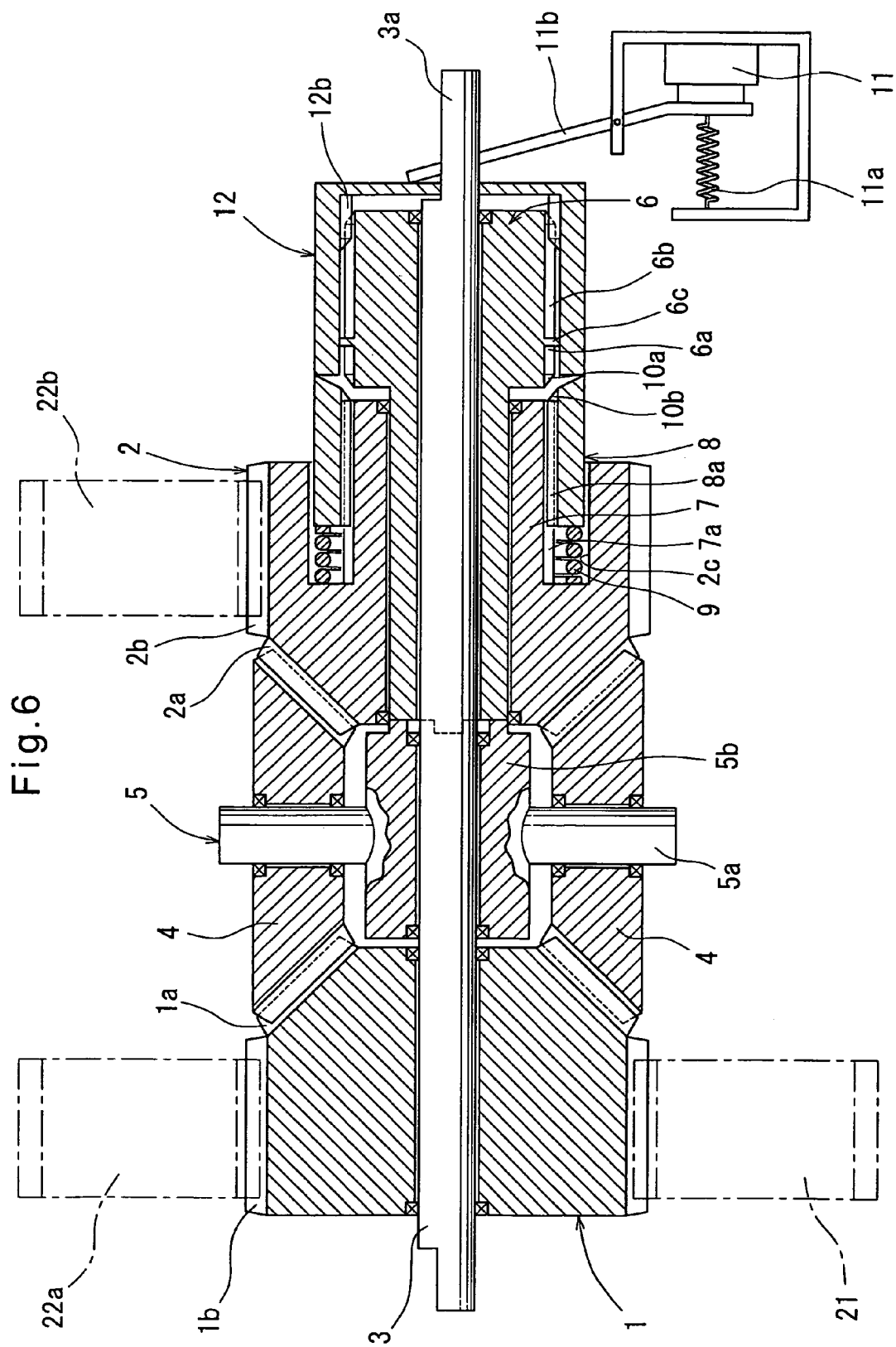
FIG. 6 is a vertical sectional view of the reversible transmission mechanism of FIG. 5, showing the state where the output member is rotated in a direction opposite to the direction in which the input member is rotated.

FIGS. 5 and 6 show the second embodiment, which is basically of the same structure as the first embodiment except that the push-back member 12 is moved axially toward the coupling ring 8 by the solenoid 11. The push-back member 12 of this embodiment is a tubular member having a bottom and rotationally fixed but axially slidable relative to the fixed shaft 3 by engaging its bottom with an end 3a of the fixed shaft 3 having a semicircular section. Its bottom is coupled to a pivot lever 11b biased by a tension coil spring 11a so as to pivot in one direction in which the push-back member 12 is axially moved away from the coupling ring 8. When the solenoid 11 is activated, the pivot lever 11b is magnetically pulled by the solenoid 11 so as to pivot in the other direction against the force of the spring 11a.

The push-back member 12 has a plurality of serrations 12b as claws on its inner surface which are configured to be axially inserted into the axial grooves 6b of the second shaft member 6 when the push-back member 12 is pushed toward the coupling ring 8. While not shown on an enlarged scale, at their opposed axial ends, the ribs defining the grooves 6b of the second shaft member 6 and the serrations 12b of the push-back member 12 have their side walls tapered into pointed tips to define teeth 13a and 13b, similar to the teeth 10a and 10b shown in FIGS. 3A and 3B, having a relief angle toward the apexes of the respective ribs and serrations. The teeth 13a and 13b axially engage each other, thereby smoothly guiding the serrations 12b into engagement with the grooves 6b. Otherwise, the second embodiment is identical to the first embodiment.

In this embodiment, when the solenoid 11 is deactivated, as shown in FIG. 5, the push-back member 12 is moved axially away from the coupling ring 8, so that the coil spring 9 pushes the coupling ring 8 rightwardly until the serrations 8a of the coupling ring 8 engage both the serrations 7a of the tubular portion 7 and the serrations 6a of the second shaft member 6. Thus, as described with respect to the first embodiment, the planetary bevel gears 4 rotate about the axis of the fixed shaft 3 without rotating about the axes of the shafts 5a of the first shaft member 5, so that the output member 2 is rotated in the second direction, and the idler gear 22b is rotated in the first direction.

When the solenoid 11 is activated, as shown in FIG. 6, the push-back member 12 is pushed leftwardly against the force of the spring 9 until the serrations 8a of the coupling ring 8 disengage from the serrations 6a of the second shaft member 6. Simultaneously, the serrations 12b of the push-back member 12 is axially inserted into the axial grooves 6b of the second shaft member 6, thereby preventing rotation of the second shaft member 6 and thus the first shaft member 5. Thus, as described with respect to the first embodiment, the planetary bevel gears 4 are rotated about the axes of the shafts 5a of the first shaft member 5 but not about the axis of the fixed shaft 3, so that the output member 2 is rotated in the first direction, and the idler gear 22b is rotated in the second direction.

In either of the embodiment, the first shaft member 5 has two diametrically opposed shafts 5a and two planetary bevel gears 4 are each mounted on one of the two shafts 5a. But instead, the first shaft member 5 may have only one shaft 5 on which one planetary bevel gear 4 is mounted. Further alternatively, the first shaft member 5 may have three or more shafts 5a angularly spaced from each other at equal intervals and each carrying a planetary bevel gear 4.

What is claimed is:

1. A reversible transmission mechanism comprising an input member rotatable about a central axis and having a bevel gear, a first shaft member rotatable about said central axis and having a shaft portion extending perpendicular to said central axis a second shaft member rotatable about said central axis and rotationally fixed to said first shaft member, an output member rotatably mounted around said second shaft member and having a bevel gear at a first end thereof axially facing the bevel gear of said input member, a planetary bevel gear rotatably mounted around said shaft portion of said first shaft member so as to mesh with said bevel gears of said input and output members, a clutch for selectively coupling and uncoupling said second shaft member to and from said output member, and a brake for stopping rotation of said second shaft member while said second shaft member is uncoupled from said output member, whereby said output member is rotated in the same direction as said input member while said output member is coupled to said second shaft member through said clutch, and is rotated in a direction opposite to the direction in which said input member is rotated while said output member is uncoupled from said second shaft member.

2. The reversible transmission mechanism of claim 1 wherein said clutch comprises a tubular portion formed on a second end of said output member opposite to said first end and having first serrations on a radially outer surface thereof, second serrations formed on a radially outer surface of an end portion of said second shaft member protruding from said tubular portion, said first and second serrations defining circles having equal diameters to each other and axially aligned with each other, and a coupling ring having third serrations formed on a radially inner surface thereof and fitted around said tubular portion with said third serrations meshing with said first serrations, said coupling member being axially slidable between a first position where said third serrations are in engagement with said first serrations and not with said second serrations, thereby uncoupling said output member from said second shaft member, and a second position where said third serrations are in engagement with both said first and second serrations, thereby coupling said output member to said second shaft member.

3. The reversible transmission mechanism of claim 2 wherein said second and third serrations have their side walls tapered at their opposed ends into pointed tips to define teeth such that said third serrations can be smoothly guided axially into between the adjacent second serrations.

4. The reversible transmission mechanism of claim 3 wherein said teeth of said second and third serrations have a relief angle toward the apexes of the respective serrations.

5. The reversible transmission mechanism of claim 2 wherein said brake comprises axial grooves formed in the radially outer surface of said end portion of said second shaft member axially outwardly of said second serrations, and a claw configured to be inserted into one of said grooves, thereby stopping rotation of said second shaft member.

6. The reversible transmission mechanism of claim 5 wherein said axial grooves are arranged over the entire circumference of the radially outer surface of said end portion of said second shaft member.

7. The reversible transmission mechanism of claim 5 wherein said clutch further comprises an elastic member which biases said coupling ring toward said second serrations until said third serrations engage said second serrations, and a push-back member for pushing said coupling ring toward the first end of said output member, thereby disengaging said third serrations from said second serrations, and wherein said claw of said brake is a portion of said push-back member.

8. The reversible transmission mechanism of claim 7 wherein said push-back member is radially movable toward and away from an axially outer end of said coupling ring, and has a tapered surface configured to abut said axially outer end of said coupling ring, thereby pushing said coupling ring toward the first end of said output member when said push-back member is moved in a radial direction, and wherein said claw of said brake is configured to be radially inserted into one of said axial grooves.

9. The reversible transmission mechanism of claim 7 wherein said push-back member is axially movable toward and away from an axially outer end of said coupling ring, and is configured to push said coupling ring toward the first end of said output member by moving axially toward the first end of said output member, and wherein said claw of said brake is configured to be axially inserted into one of said axial grooves.

10. The reversible transmission mechanism of claim 9 wherein said axial grooves are serration-shaped grooves arranged circumferentially spaced apart from each other over the entire circumference, wherein said push-back member is a tubular member having a radially inner surface, wherein there are a plurality of said claws formed on the radially inner surface of said push-back member, wherein said plurality of claws are serration-shaped members arranged circumferentially spaced from each other over the entire circumference, and wherein at axially opposed ends, ribs defining said axial grooves and said claws have their side walls tapered into pointed tips to define teeth such that said claws can be smoothly guided into the respective axial grooves.

11. The reversible transmission mechanism of claim 1 wherein said output member carries on a radially outer surface thereof a spur gear as a rotation output member.

12. The reversible transmission mechanism of claim 1 wherein said input member carries on a radially outer surface thereof a spur gear as a rotation input member.

13. The reversible transmission mechanism of claim 12 wherein said spur gear of said input member is used as a rotation output member.

* * * * *